Figure 1:
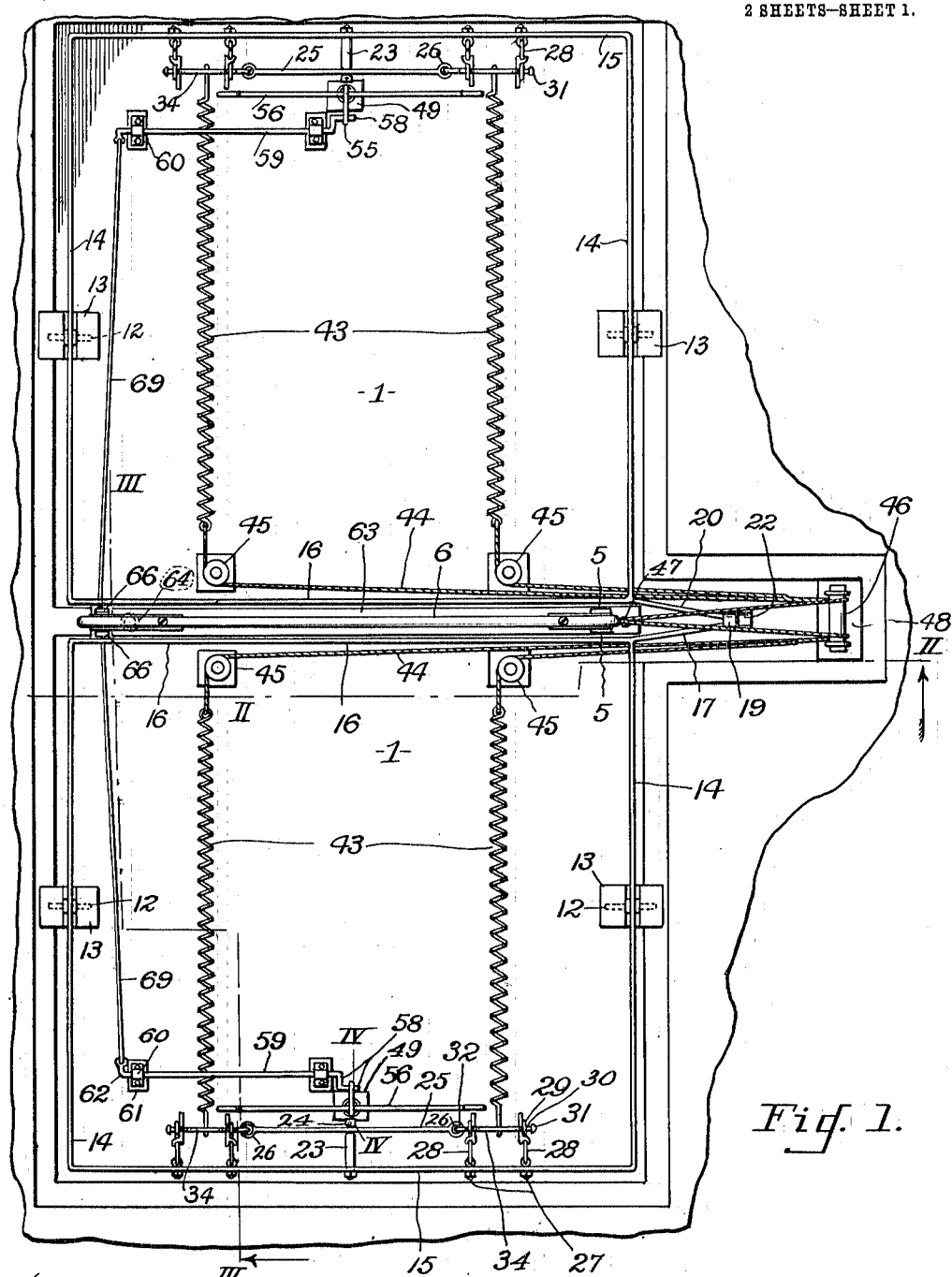

M. BOOM.
AUTOMATIC GATE.
APPLICATION FILED MAY 29, 1912.
1,059,429.
Patented Apr. 22, 1913.
2 SHEETS—SHEET 2.
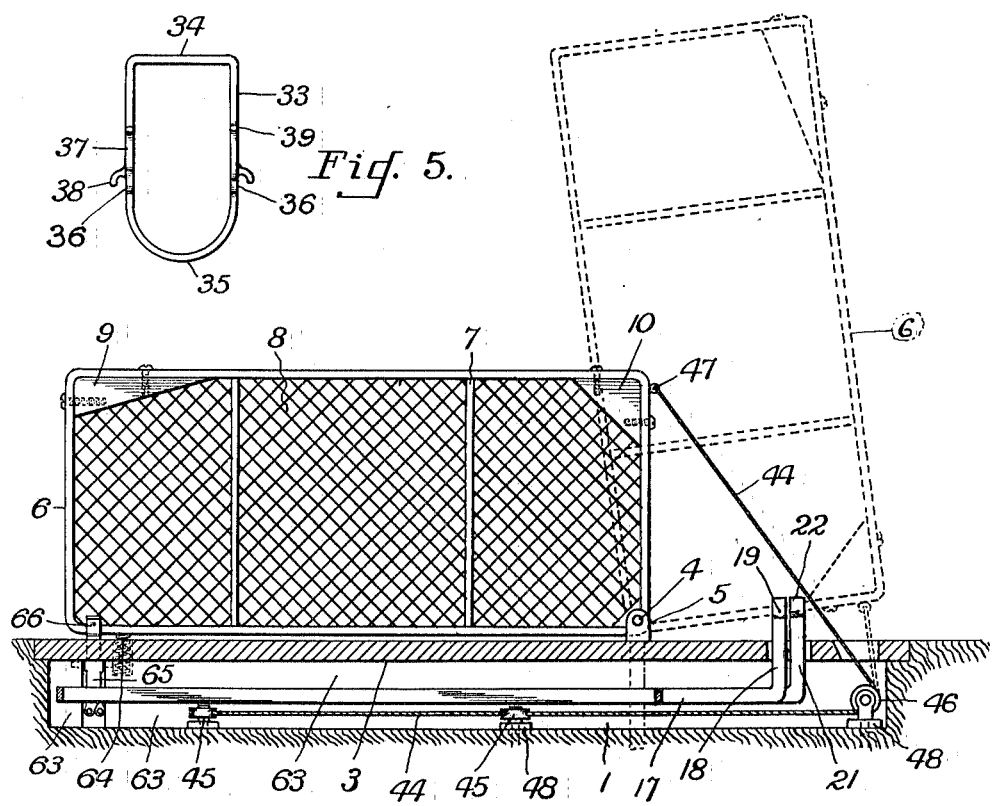
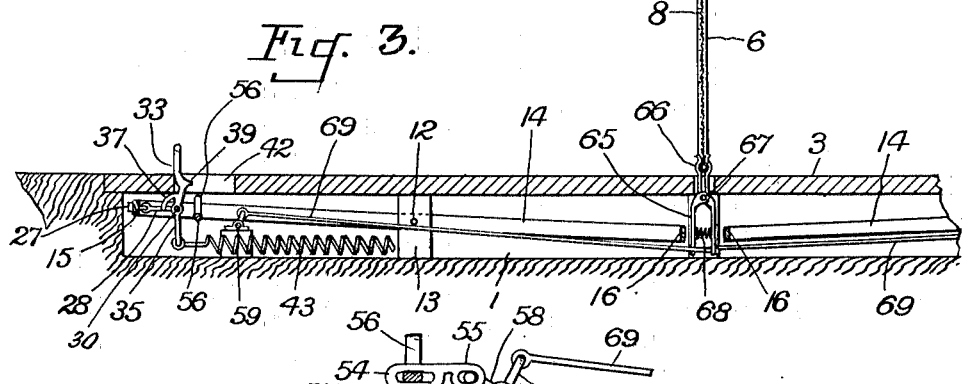
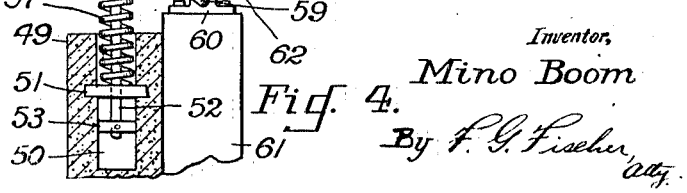
Inventor,
Mino Boom
By F. G. Fischer, Atty.
Witnesses:
R. Hamilton
E. C. Lillian,

UNITED STATES PATENT OFFICE.

MINO BOOM, OF BLADEN, NEBRASKA.

AUTOMATIC GATE.

1,059,429.  Specification of Letters Patent.  Patented Apr. 22, 1913.

Application filed May 29, 1912. Serial No. 700,389.

*To all whom it may concern:*

Be it known that I, MINO BOOM, a citizen of the United States, residing at Bladen, in the county of Webster and State of Nebraska, have invented certain new and useful Improvements in Automatic Gates, of which the following is a specification.

This invention relates to farm or stockyard gates, of the class in which the gate opening and closing means are actuated by the wheels of a vehicle, or by the feet of men.

The object of the invention is to provide a farm or stock-yard gate which is operated without the use of the hands and can be opened without a halt of the vehicle passing through. In order that my invention may be fully understood, reference will now be made to the accompanying drawings, in which: Figure 1 is a top plan view of a gate constructed in accordance therewith, the covering platform being omitted. Fig. 2 is an elevational view of the gate in closed position and in dotted lines in open position, the platform and subjacent parts being in section on line II—II of Fig. 1. Fig. 3 is a longitudinal sectional view on line III—III of Fig. 1, the gate being in closed position, and the platform shown. Fig. 4 is a detail view, being a section on line IV—IV of Fig. 1. Fig. 5 is a detail view of one of the yoke-levers, detached from other parts.

To receive the gate-operating mechanism, a shallow pit 1 is dug at each side of the gate, designated 6, 7 and 8. When the mechanism has been installed the pit is covered with a platform 3, which is on a level with the ground. The gate is pivoted at one corner, for vertical movement, upon a pin 4 held by a bifurcated lug 5, secured to the platform 3. As shown the gate comprises a rectangular metal frame 6, uprights 7, and a filler of woven wire 8.
Weights 9 and 10 are secured in the respective upper corners of the gate.

Within the pit 1 are four fulcrums 12, mounted on small concrete piers 13 that rise to the bottom of the platform 3 and partly support same. Each of said piers is slotted as shown on Fig. 1.

Mounted on each pair of fulcrums 12 is a rectangular tilt-frame 14—15, comprising longitudinals 14, pivoted on said fulcrums, and transversals 15 and 16. One inner corner of one frame is provided with a horizontally-extending arm 17, having an upward extension 18 which passes through a slot in the platform and terminates in a fork 19. Similarly, the other frame 14—15 is provided with an arm 20 having an upward extension 21 with a fork 22, set in alinement with fork 19. Said forks are located so as to receive and support one end of the gate when the latter is in open position.

The following description of one end of the apparatus will apply to the other end thereof, as they are duplicate. Rigidly-fixed to the middle of the transversal 15 is an inwardly-projecting stud 23, into which is threaded a headed screw 24, which serves as a fulcrum for a transverse bar 25, having on its ends eyes 26. The fulcrum support on 24 is loose, to permit some play in a horizontal plane. Beyond each eye 26, two eyebolts 27 are mounted on the bar 15. Pivoted on said eyebolts are a pair of inwardly-extending links 28, each having an eye 29 at its inner end. Extending through said pair of eyes is a transverse rod 30, having a head 31 on its outer end and an eye 32 on its inner end. Pivotally-mounted on the rod 30 is an actuating yoke-lever 33, which is formed as shown on Fig. 5, having the two parallel companion members 33, an upper connecting-member 34, and a lower connecting yoke 35, all integral. The lever members proper 33 are provided with alined eyes 36, through which the rod 30 extends, thus pivotally-supporting the lever. Also integral with the lever members 33 are two rests 37, terminating in forks 38 that rest upon the respective links 28. Extending oppositely from the rests 37 are a pair of lugs 39, located to strike a movable bar 56, presently referred to. There are two of said yoke-levers 33, located at equal distances from the fulcrum stud 23, and being connected to the respective ends of bar 25 by the short transverse rods 30. The yoke-levers 33 project through slots 42 in the platform, as shown on Fig. 3, and their cross members 34 are adapted to be impinged on by the front wheels of a vehicle, and are spaced a proper distance apart for that purpose. They are also operable by the foot of a person stepping thereon. In normal position said levers stand at or against one end of the slots 42.

Connected to the depending yokes 35 of yoke-levers 33, respectively, are two spiral tension-springs 43, which extend toward the gate and are connected to cables 44, which pass around pulleys 45 and 46 and from the latter obliquely upward to the adjacent upper corner of the gate, being fastened to an eye 47 thereon. The pulleys 45 and 46 are mounted on concrete piers 48, which are suitably anchored. Close to the center of the pivoted bar 25, a pier 49 is set. This pier has a vertical bore 50, across the middle of which is embedded a guide-plate 51, having an opening through which a vertical rod 52 slidably passes. On the lower end of rod 52 is a collar 53, adapted to slide freely in the bore 50. Integral with the upper end of said rod are two loops 54 and 55. Through the loop 54, which is directly above the rod, passes a transverse bar 56, the ends of which lie close to and below the respective lugs 39 of the yoke-levers 33, and in position to be struck by said lugs when the yoke-levers are actuated. The bar 56 is held rather loosely by the loop 54, and is normally upheld by a compression spring 57 that rests on the rod guide 51. The loop 55 on rod 52 is engaged by a crank 58, on a transverse rock-shaft 59, having bearings 60 on two piers 61. On the opposite end of shaft 59 is a crank 62.

Referring to Figs. 1 and 2, the middle of the platform 3 is supported by a concrete wall 63, built across the pit and beneath the gate 2. A gate-supporting spring 64 is housed in an opening in the platform and wall 63. Said wall is cut away, as shown, to receive a pair of lever-arms 65 of gate-clamps 66, which arms and clamps are pivoted on a pin 67 whose ends are embedded in the wall 63. Said clamps are located close to the outer end of the gate, and are adapted to engage the gate frame 6 when the gate is in fully lowered position. The lower clamp-arms 65 are pressed apart by a suitable spring 68, which draws the clamps 66 together. Said arms are operatively connected with the respective cranks 62 on the respective rock-shafts 59, in such a way that the actuation of either of said rock-shafts will disengage one of the gate-clamps 66 from the gate. The connecting rods 69 are connected with the clamp arms 65 by passing through the latter and being provided with heads.

The operation will be substantially as follows: The gate being closed, suppose that a wagon, or wheeled machine of any kind, approaches the gate. The front wheels are guided so that each of them shall strike one of the yoke-levers 33, this is, the top portion 34 thereof. The movement and pressure of the wheels turn said levers downwardly about the pivot rods 30; the lugs 39 impinge on the crossbar 56 and depress said bar, equally at both ends, loop 55 rocks the crank 58, shaft 59 and crank 62; the latter pulls rod 69, which cautates clamp arms 65 and 66 of one half of the clamp. A further effect of said movement of the yoke-levers 33 is to increase the tension of springs 43. The gate, being relieved of the friction of one holding member 66, will immediately be raised by the pull of springs 43, assisted by a thrust from spring 64, through the cables 44, to such a point that it will pass by gravity into the dotted line position, Fig. 2, where its frame will come to rest upon the forks 19 and 20. The wagon or machine passes through the gateway and its front wheels then strike the yoke-levers 33 at the other end of the platform. In this case, said levers can not be turned pivotally, but are directly depressed by the wheels, thereby depressing the outer end of the tilt-frame 14—15 and up-tilting the inner end thereof, which carries the gate fork 19 or 22. The fork, being forcibly and suddenly raised, will throw the gate back past its center of gravity and the gate will fall to closed position, its fall being moderated and checked by the tensioning of the main springs 43. At the end of the fall, spring 64 acts as a buffer. The weight 9 helps to compress said spring, so that the bottom rail of the gate will descend far enough to separate and enter between the clamp members 66, which hold it there until one of them is again disengaged. I have designed the gate-actuating mechanism with an object in view of preventing the accidental opening or closing of the gate. This is the object of the independently movable mounting of the yoke-levers, and the pivoting of bars 56 and 25. Either end alone of bar 56 may be depressed without moving down the rod 52. Hence either of the yoke-levers 33, alone, may be depressed without depressing said rod 52, and the gate will not be opened or closed by such movement. Thus an animal may depress one of the yoke-levers and the gate will not be opened. The yoke levers may be of sufficient width to bring each pair close enough together to allow a person on foot to open the gate by placing a foot on each yoke-lever of a pair, simultaneously, and close the gate by actuating the other pair in the same way.

Having thus described my invention what I claim and desire to secure by Letters Patent, is:

1. A gate and a gate-opening mechanism comprising a tiltably-mounted hollow frame located in a pit at one side of the gate, a pair of yoke-levers mounted on said frame and extending into the path of vehicle wheels, a spring tending to open the gate, means normally holding the gate closed, and means actuated by said levers together, for actuating said gate-holding means to release the gate.

2. A gate and a gate-opening mechanism comprising a tiltably-mounted hollow frame located in a pit at one side of the gate, a lever pivoted on said frame, links pivoted on said frame adjacent the ends of said lever, two yoke-levers floatingly supported by said links and lever and projecting into the path of vehicle wheels, a spring tending to open the gate, means normally holding the gate closed, and means actuated by said levers together, for actuating said gate-holding means to release the gate.

3. A gate, and a gate-opening mechanism comprising a tiltably-mounted hollow frame located in a pit at one side of the gate, a pair of yoke-levers floatingly-mounted on said frame and extending into the path of vehicle-wheels, a pivoted bar having its ends located to be moved by said yoke-levers respectively, a spring-pressed support for the center of said lever, means normally-holding the gate closed, and means actuated by said lever to cause said gate-holding means to release the gate.

4. A gate, and gate-closing mechanism comprising a frame tiltably-mounted in a pit at one side of the gate, means carried by one end of said frame for starting the gate toward closed position, and frame-tilting means carried by the opposite end of said frame and extending into the path of vehicle wheels, said frame-tilting means being depressible by pressure thereon and transmitting their motion to said frame on which they are carried.

5. A gate, a spring tending to open the gate, means normally holding the gate closed, a platform, two slots in the platform, levers projecting through said slots and in the path of vehicle wheels, a frame tiltably-mounted below the platform, yieldingly mounted fulcrums for said levers, connections between said fulcrums and said frame, gate-closing means actuated by said frame, and gate-releasing means actuated by said levers; said gate-closing means being operated by direct depression of said levers, and said gate-releasing means being operated by turning of said levers upon their fulcrums.

6. A gate, and gate-opening mechanism comprising a frame tiltably-mounted in a pit, two levers floatingly-mounted on one end of said frame and extending into the path of vehicle wheels, said levers having downwardly-extending yokes; tension springs connected to said yokes, cables connected to said springs and connected with the gate for opening the same, means normally holding the gate closed, and means operable by said levers together, for causing said gate-holding means to release the gate.

7. A gate, and gate-opening mechanism comprising a frame tiltably-mounted in a pit, two levers floatingly-mounted on one end of said frame and extending into the path of vehicle wheels, said levers having downwardly-extending yokes; tension springs connected to said yokes, cables connected to said springs and connected with the gate for opening the same, means normally holding the gate closed, means operable by said levers together, for causing said gate-holding means to release the gate, and a platform covering said frame, pit and springs and having slots through which said levers project.

8. A gate, and gate-opening mechanism comprising a frame tiltably-mounted in a pit, two levers floatingly-mounted on one end of said frame and extending into the path of vehicle wheels, said levers having downwardly-extending yokes; tension springs connected to said yokes, cables connected to said springs and connected with the gate for opening the same, means normally holding the gate closed, and means operable by said levers together, for causing said gate-holding means to release the gate.

In testimony whereof I affix my signature, in the presence of two witnesses.

MINO BOOM.

Witnesses:
　GEORGE GREIG,
　GEORGE FRITZ.